Aug. 5, 1952 R. DABBS ET AL 2,605,818
TRAVELER'S BACK AND HEADREST
Filed May 1, 1947
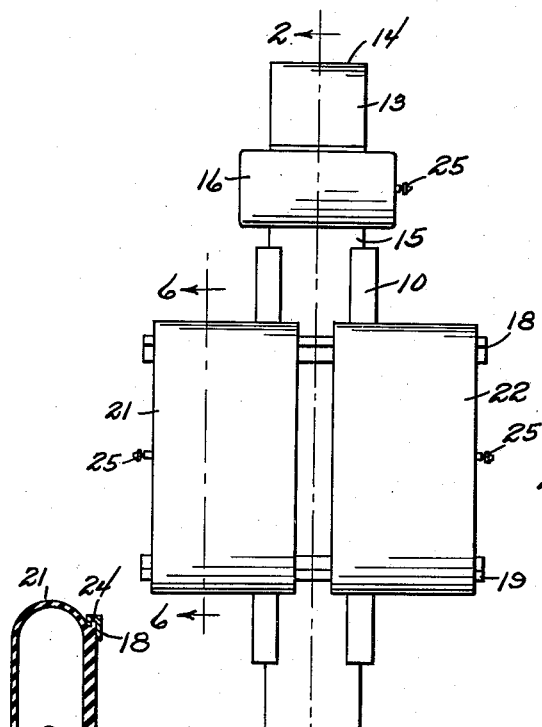
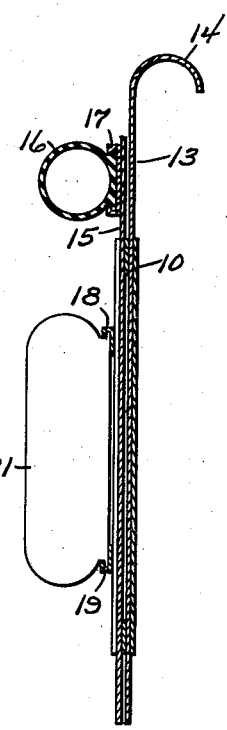
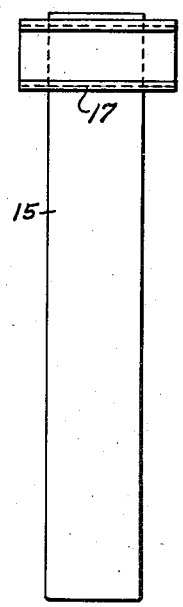
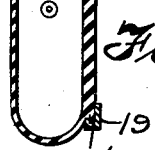
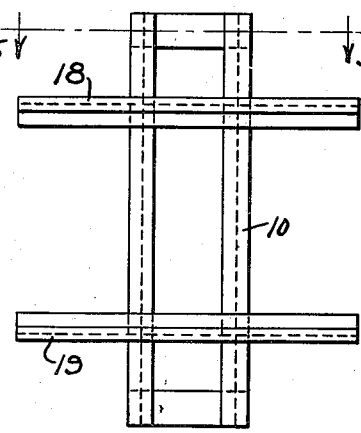
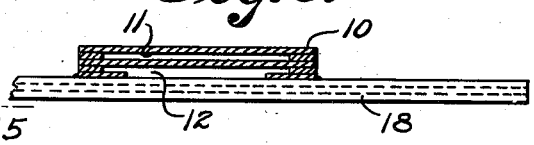
INVENTORS
Robert Dabbs
James M. Burwell
BY Victor J. Evans & Co.
ATTORNEYS Patented Aug. 5, 1952

2,605,818

UNITED STATES PATENT OFFICE 2,605,818

TRAVELER'S BACK AND HEADREST

Robert Dabbs and James M. Burwell,
Pittsburgh, Pa.

Application May 1, 1947, Serial No. 745,180

2 Claims. (Cl. 155—174)

This invention relates to a traveler's back and head rest adapted to be disposed on an automobile seat or other like seats.

It is an object of the present invention to provide an adjustable back and head rest which can be supported from the back of a seat and which will have portions against which the back can rest and against which the head can rest with these portions being adjustable relative to one another, the rest can be used by different persons of different size and height and wherein the rest portions are formed of tubes adapted to be inflated with air whereby when the rest is not in use it can be deflated and will consume little space.

Another object of the present invention is to provide an adjustable back and head rest for travelers which is of simple construction, inexpensive to manufacture and efficient in operation.

For other objects and for a better understanding of the invention, reference may be had to the following detailed description taken in connection with the accompanying drawing, in which Fig. 1 is a front elevational view of the combined back and head rest.

Fig. 2 is a longitudinal cross-sectional view taken on line 2—2 of Fig. 1.

Fig. 3 is a front elevational view of the head rest portion removed from the other parts.

Fig. 4 is a front elevational view of the back rest support removed from the other parts.

Fig. 5 is an enlarged fragmentary and transverse cross-sectional view taken on line 5—5 of Fig. 4.

Fig. 6 is a cross-sectional view, in elevation, taken on line 6—6 of Fig. 1.

Referring now to the figures, 10 represents a vertically extending member formed to provide guide ways 11 and 12 into which there are respectively extended a hook member 13 having a portion 14 adapted to be extended over the top of a seat back and a head rest support 15 having an inflatable tube 16 fixed to a support 17 by a tongue and groove connection as seen more clearly in Fig. 2. The support 17 is fixed to the upper end of the head rest support 15, and the tongue and groove connection permits lateral adjustment of the tube 16 with respect to the support 17.

On the frame 10 and extending transversely across the front of the same at vertically spaced locations thereon, are guideways 18 and 19 into which are slid from opposite sides of the same inflatable tubes 21 and 22 having tongue projections 24 fitting the guideways 18 and 19. The inflatable members have tight fitting engagement with their guideways and can be adjusted therein and retained by friction to the positions to which they have been adjusted. These tubes or cushions are inflated by attaching an air pump to an air inlet stem 25. The air tubes of cushions of 21 and 22 can be separated to different distances so as to be comfortable upon the back of the person using the rest. By adjusting the hook 13 the cushions 21 and 22 will be brought to the proper height or location in rear of the back of the person. Thereafter the head rest support 15 can be elevated through the frame 10 to a point below or above the hook 13 to properly locate the head cushion. Accordingly the back cushion and the head cushion 16 can be adjusted relative to one another.

It should now be apparent that there has been provided a simple and inexpensive back and head rest which can be easily adjusted to the back of a seat and which can be deflated when not in use so as to consume little space. This back and head rest can be used on automobile seats or on the coaches of a train where one is to spend long hours in traveling.

While various changes can be made in the detail construction, it shall be understood that such changes shall be within the spirit and scope of the present invention as defined by the appended claims.

We claim:

1. In a back and head rest having a main frame with vertical guideways therein, and transverse guideways on the main frame and back rest cushions positioned in said transverse guideways for lateral adjustment in relation to said frame the improvement comprising a hook member adapted to engage with the top of a seat back slidable in one of the vertical guideways and a head rest support slidable in the other guideways whereby a head rest cushion may be positioned above or below the said hook member, said cushion being on the upper end of the head rest support.

2. In a back and head rest having a main frame with vertically extending guideways therein, and back rest cushions connected to the frame, the improvement comprising a hook member adapted to engage with the top of a seat back slidable in one of the guideways and a head rest support slidable in the other guideways whereby a head rest cushion may be positioned above or below the said hook member, said cushion being on the upper end of the head rest support, guideway means connected to the upper end of the head rest support and said head rest cushion being laterally adjustable relative to the guideway means connected to the upper end of the head rest support.

ROBERT DABBS.
JAMES M. BURWELL.

REFERENCES CITED

The following references are of record in the file of this patent:

UNITED STATES PATENTS

| Number | Name | Date |
|---|---|---|
| 409,389 | Campbell | Aug. 20, 1889 |
| 567,096 | Harvey | Sept. 1, 1896 |
| 1,358,644 | McCann | Nov. 9, 1920 |
| 1,597,355 | Fussell | Aug. 24, 1926 |
| 2,060,298 | Gailey | Nov. 10, 1936 |
| 2,063,732 | Gailey | Dec. 8, 1936 |
| 2,181,465 | Schneider | Nov. 28, 1939 |

FOREIGN PATENTS

| Number | Country | Date |
|---|---|---|
| 284,265 | Germany | Sept. 9, 1913 |